United States Patent [19]

Abe et al.

[11] 4,448,580

[45] May 15, 1984

[54] PROCESS FOR PRODUCING α-METHYL STYRENE-METHYL METHACRYLATE-ACRYLONITRILE THERMOPLASTIC RESIN

[75] Inventors: Mitsuo Abe; Syuji Tsuchikawa; Teizo Fukuta, all of Yokkaichi; Tsugio Asakawa, Suzuka, all of Japan

[73] Assignee: Japan Synthetic Rubber Co., Ltd., Tokyo, Japan

[21] Appl. No.: 421,777

[22] Filed: Sep. 23, 1982

[30] Foreign Application Priority Data

Sep. 29, 1981 [JP] Japan .................................. 56-154150

[51] Int. Cl.³ .................. C08L 55/02; C08L 33/12; C08F 257/02
[52] U.S. Cl. .......................................... 525/71; 525/83; 525/84; 525/261; 525/262; 525/308
[58] Field of Search ............... 525/71, 262, 308, 83, 525/84; 526/80, 329.2, 329.3

[56] References Cited

U.S. PATENT DOCUMENTS 3,463,833   8/1969   Isogawa et al. ................. 525/84
4,294,946  10/1981   Minematsu et al. ............. 526/80
4,306,043  12/1981   Abe et al. ....................... 526/80

Primary Examiner—Carman J. Seccuro
Attorney, Agent, or Firm—Oblon, Fisher, Spivak, McClelland & Maier

[57] ABSTRACT

A thermoplastic resin having an excellent thermal stability and a high heat resistance is prepared by initiating polymerization of 65–85 parts by weight of a monomer mixture (A) consisting of 50–85% by weight of α-methylstyrene, 3–20% by weight of methyl methacrylate, 2–20% by weight of acrylonitrile, and 0–25% by weight of an aromatic alkenyl compound other than α-methylstyrene, continuously or intermittently adding, on the way of the polymerization, 2–15 parts by weight of a monomer (B) consisting of acrylonitrile or a mixture thereof with an aromatic alkenyl compound other than α-methylstyrene to the polymerization system while continuing the polymerization, further adding to the polymerization system 5–25 parts by weight of a monomer (C) consisting of an aromatic alkenyl compound other than α-methylstyrene, or a mixture thereof with acrylonitrile, and continuing the polymerization to complete the polymerization, the total amount of monomers (A), (B), and (C) being 100 parts by weight. Further, a thermoplastic resin composition having an excellent thermal stability, a high heat resistance and a high impact strength is prepared by mixing the thermoplastic resin thus obtained with a graft copolymer obtained by grafting 60–30 parts by weight of a monomer mixture consisting of 65–80% by weight of an aromatic alkenyl compound and 35–20% by weight of acrylonitrile on 40–70 parts by weight of a diene rubbery polymer in such a proportion that the composition contains 10–30% by weight of the rubbery polymer.

16 Claims, No Drawings

PROCESS FOR PRODUCING α-METHYL STYRENE-METHYL METHACRYLATE-ACRYLONITRILE THERMOPLASTIC RESIN

This invention relates to a novel process for producing a thermoplastic resin having an excellent thermal stability and a high heat resistance comprising four constituents of α-methylstyrene, methyl methacrylate, acrylonitrile, and an aromatic alkenyl compound typified by styrene, and also to a process for producing a resin composition having an excellent thermal stability, a high heat resistance, and a high impact strength using said thermoplastic resin.

For the purpose of improving the heat resistance of styrene-acrylonitrile copolymer, there has hitherto been used in general a method in which α-methylstyrene is substituted for a part or the whole of the styrene. In addition, for the purpose of improving the heat resistance of a rubber-modified thermoplastic resin typified by an ABS resin, there has been used a method in which α-methylstyrene is used as part of the grafting monomer or a method in which an α-methylstyreneacrylonitrile copolymer is mixed with an acrylonitrilebutadiene-styrene copolymer. Although the thermoplastic resin produced by one of these methods has come to be used as an interior finishing material in the fields of automobile, electronic device and electrical domestic appliance, a problem of heat distortion has arisen in applications thereof at high ambient temperatures. When it is intended to obtain a large size shaped article by injection molding, it is necessary to conduct the injection molding at high temperatures, and at that time, it is particularly required that the resin is highly heat-stable. The conventional thermoplastic resins mentioned above have not satisfactorily solved such problems. Thus, in order to further enhance the heat resistance of this resin, there have been proposed resin compositions comprising an α-methylstyrene-methyl methacrylateacrylonitrile copolymer in Japanese Patent Publication No. 33304/70, U.S. Pat. No. 3,463,833, etc. However, in the production of a terpolymer of α-methyl styrene, methyl methacrylate and acrylonitrile, it is difficult to copolymerize uniformly these three monomers because of their different reactivities. In particular, α-methylstyrene has a low reactivity and hence its proportion remaining unreacted increases as the copolymerization proceeds. Accordingly, the polymer formed in the later stage of the copolymerization contains many α-methylstyrene chains in the molecule, thus giving a composition having a poor thermal stability.

The present inventors have investigated such a problem, in other words, the problem of how to improve the thermal stability of a resin comprising a large number of highly heat-resistant α-methylstyrene-methyl methacrylate copolymer chains. As a result, they have found that the above problem can be solved by addition of certain monomer mixtures during polymerization, and then continuing the polymerization.

According to this invention, there is provided a process for producing a thermoplastic resin having an excellent thermal stability and a high heat resistance, which comprises initiating the polymerization of 65-85 parts by weight of a monomer mixture (A) consisting of 50-85% by weight of α-methylstyrene, 3-20% by weight of methyl methacrylate, 2-20% by weight of acrylonitrile, and 0-25% by weight of an aromatic alkenyl compound other than α-methylstyrene, continuously or intermittently adding, on the way of the polymerization, 2-15 parts by weight of a monomer (B) consisting of acrylonitirle or a mixture thereof with an aromatic alkenyl compound other than α-methylstyrene to the polymerization system, while continuing the polymerization, further adding 5-25 parts by weight of a monomer (C) consisting of an aromatic alkenyl compound other than α-methylstyrene, or a mixture thereof with acrylonitrile and continuing the polymerization to complete the polymerization, the total amount of monomers (A), (B) and (C) being 100 parts by weight.

The thermoplastic resin obtained by this process is excellent in thermal stbility and heat resistance as compared with the analogous resins obtainable by the prior art. A thermoplastic resin composition having an excellent thermal stability, a high heat resistance, and a high impact strength can be prepared by mixing said thermoplastic resin with another resin reinforced with a diene rubbery polymer, for example, with ABS reins.

Thus, this invention also provides a process for producing a thermoplastic resin composition having an excellent thermal stability, a high heat resistance, and a high impact strength, which comprises mixing the thermoplastic resin obtained by the above-mentioned process with a graft copolymer obtained by grafting 60-30 parts by weight of a monomer mixture consisting of 65-80% by weight of an aromatic alkenyl compound and 35-20% by weight of acrylonitrile on 40-70 parts by weight of a diene rubbery polymer, in such a proportion that the composition contains 10-30% by weight of the rubbery polymer.

In the process for producing the thermoplastic resin of this invention, it is especially important to prevent the α-methylstyrene chain and α-methylstyrenemethyl methacrylate chain from becoming too long, and incorporate these chains as much as possible within the range that the thermal stability is not adversely affected thereby. For this purpose, in this invention, a monomer consisting of an aromatic alkenyl compound other than α-methylstyrene or a mixture thereof with acrylonitrile is added to the polymerization system at the latter half stage of polymerization to complete the polymerization because the control of polymerization at a high polymerization conversion becomes difficult, whereby the thermal stability is improved. Moreover, in the polymerization of a monomer mixture of 50% by weight or more of α-methylstyrene with methyl methacrylate, acrylonitrile, and an aromatic alkenyl compound other than α-methylstyrene, the proportion of α-methylstyrene remaining in unreacted monomers increases and polymer chains inferior in thermal stability tend to be produced as the polymerization proceeds. Accordingly, in this invention, after the polymerization of 65-85 parts by weight of the monomer mixture (A) consisting of 50-85% by weight of α-methylstyrene, 3-20% by weight of methyl methacrylate, 2-20% by weight of acrylonitrile, and 0-25% by weight of an aromatic alkenyl compound other than α-methylstyrene has been started, 2-15 parts by weight of the monomer (B) consisting of acrylonitrile or a mixture thereof with an aromatic alkenyl compound other than α-methylstyrene is added continuously or intermittently to the polymerization system on the way of polymerization, preferably when the polymerization conversion has reached 10-50%, thereby improving the thermalstability of the polymer. If the α-methylstyrene content in the monomer mixture (A) at the start of polymerization is less than 50% by weight, the heat-resistance becomes undesirably low. If it exceeds 85% by weight, no resin of good thermal stability is obtained. If the methyl methacrylate content is less than 3% by weight, the heat resistance is also too low. If it is more than 20% by weight, the thermal stability is deteriorated. The methyl methacrylate serves to increase the polymerization rate, giving not only a higher polymerization conversion but also a higher molecular weight than where no methyl methacrylate is used, and the resulting resin has excellent mechanical properties. If the acrylonitrile content is less than 2% by weight, the impact strength becomes low, and if it is more than 20% by weight, the heat resistance becomes low and the color tone of the molded products becomes inferior. If the content of the aromatic alkenyl compound other than α-methylstyrene exceeds 25% by weight, the heat resistance becomes low. When the mixture (A) of these monomers is used in an amount of less than 65 parts by weight, the heat resistance becomes also low, and when this amount exceeds 85 parts by weight, the thermal stability becomes low. As mentioned above, the monomer (B), consisting of acrylonitrile or a mixture thereof with an aromatic alkenyl compound other than α-methylstyrene (the content of the alkenyl compound in the mixture is preferably up to 50% by weight) is added continuously or inermittently in an amount of 2-15 parts by weight on the way of polymerization. If this amount is less than 2 parts by weight, no effect of the addition is observed. If it exceeds 15 parts by weight, the heat resistance becomes low. After the addition of the monomer (B), the monomer (C) consisting of an aromatic alkenyl compound other than α-methylstyrene, or a mixture thereof with acrylonitrile (the acrylonitrile content in the mixture is preferably up to 30% by weight), is added, as mentioned above, in an amount of 5-25 parts by weight. If this amount exceeds 25 parts by weight, the heat resistance becomes low. If it is less than 5 parts by weight, no effect of improving the thermal stability is observed. The monomer (C) is added when the polymerization conversion based on the monomers (A) and the monomer (B) reaches preferably 60% or more, more preferably 70% or more.

The monomers (A), (B), and (C) are used within the respective amount ranges defined above so that the total amount thereof becomes 100 parts by weight.

In the polymerization according to this invention, it is desirable to add acrylonitrile so that the total amount of acrylonitrile added and acrylonitrile remaining unreacted in the polymerization system at the time of the addition does not exceed 40% by weight based on the total weight of all the monomers remaining unreacted at that time in the polymerization system.

The aromatic alkenyl compounds other than α-methylstyrene for use in the production of the present thermoplastic resin include styrene, ring-halogenated styrenes, p-methylstyrene, vinyltoluene, etc., among which styrene is particularly preferred.

The graft copolymers suitable for mixing with the present thermoplastic resin are obtained by the graft polymerization of 60-30 parts by weight of a monomer mixture consisting of 65-80% by weight of an aromatic alkenyl compound and 35-20% by weight of acrylonitirle on 40-70 parts by weight of a diene rubbery polymer. As the diene rubbery polymer, there may be used polybutadiene, butadiene-styrene copolymer, polyisoprene or polychloroprene, alone or in admixture of two or more. For the aromatic alkenyl compound, styrene is preferred while α-methylstyrene, p-methylstyrene, and vinyltoluene are usable. In addition to acrylonitrile and aromatic alkenyl compounds, other alkenyl compounds copolymerizable therewith such as alkyl acrylates and methacrylates, for example, methyl methacrylate, methyl acrylate and the like, may also be used in a small amount. The graft polymer thus obtained has a high rubber component content and can accordingly be blended with a large quantity of the highly heat resistant thermoplastic resin of this invention. A thermoplastic resin composition superior in heat resistance and impact strength having a good thermal stability can be obtained by mixing the graft polymer with the thermoplastic resin so that the composition may contain 10-30% by weight of the diene rubbery polymer. It is also possible to mix additionally a styreneacrylonitrile resin (AS resin), thereby preparing a resin composition having any balance of flow property, heat resistance, and impact strength. When the abovementioned specific graft polymer is mixed with the above α-methylstyrene-methyl methacrylate-acrylonitrilestyrene copolymer resin, good results are obtained, and it may, of course, be mixed with a variety of usual rubber-reinforced resins, for example, ABS resin, a graft copolymer of acrylonitrile and styrene on an olefin rubber a graft copolymer of acrylonitrile and styrene on an acrylic rubber, etc., to improve its heat resistance.

The above thermoplastic resin and graft copolymer are produced preferably by emulsion polymerization. Emulsifiers for use in these emulsion polymerizations include anionic surfactants, e.g. potassium or sodium salts of higher fatty acids such as lauric acid, stearic acid, and oleic acid; alkali metal salts of alkylbenzenesulfonic acids; alkali metal salts of sulfates of higher alcohols; and salts of disproportionated rosin acid. These emulsifiers may be used alone or in combination. A polymerization catalyst may be used in said emulsion polymerization, and as the catalyst, there may be used persulfates and redox catalysts which are combinations of organic peroxides typified by cumene hydroperoxide, diisopropylbenzene hydroperoxide, p-methane hydroperoxide and the like, with reducing agents typified by sugar-containing pyrophosphate formulation, sulfoxylate formulation and the like. In addition, it is also possible to use a molecular-weight regulator, a polymerization stabilizer, and the like as far as they are generally used in emulsion polymerization.

The thermoplastic resin and the graft copolymer may be mixed in the latex form, coagulated and then dried or may be separately coagulated and dried followed by mixing the resulting powders or pellets. The mixing ratio may slightly be varied depending upon the respective compositions and the intended use of product, though it is preferable to mix the two so that the composition contains 10-30% by weight of the diene rubbery polymer. If the content of the diene rubbery polymer is less than 10% by weight, the impact strength of the composition is unsatisfactory. If it exceeds 30% by weight, the stiffness becomes low. When mixing or pellitizing the two, there may be added stabilizers of the bisphenol type, the phenol type, the phosphorus type, etc.; lubricants such as amide compounds, salts or esters of carboxylic acids, silicon compounds, waxes, etc.; pigments; fillers; and the like.

Resin foams having excellent heat resistance can also be obtained from the thermoptastic resin composition in combination of a known foaming agent such as azodicarbonamide, dinitrosopentamethylenetetramine, benzenesulfonylsemicarbazide, toluenesulfonylsemicarbazide, toluenesulfonylhydrazide, benzenesulfonylhydrazide, 4,4'-oxybis(benzenesulfonylhydrazide), azobisisobutyronitrile, and the like.

This invention will be illustrated in more detail referring to Examples. In the Examples and Comparative Examples, "parts" and "%" are by weight unless otherwise specified.

EXAMPLE 1

Preparation of α-methylstyrene-methyl methacrylate-acrylonitrile-styrene quadripolymer Into a reactor provided with a stirrer and purged with nitrogen were charged 180 parts of ion-exchanged water, 1.8 parts of potassium stearate, a mixture of α-methylstyrene, methyl methacrylate, acrylonitrile and styrene which is the monomer (A) shown in Table 1, and 0.3 part of tertiary dodecylmercaptan, and the resulting mixture was emulsified. The temperature of the resulting emulsion was elevated to 40° C. while stirring under a stream of nitrogen. A solution of 0.16 part of sodium formaldehydesulfoxylate, 0.08 part of sodium ethylenediaminetetraacetate, and 0.003 part of ferrous sulfate in 16 parts of ion-exchanged water was added thereto, and then 0.25 part of cumene hydroperoxide was added to initiate the polymerizatin. The polymerization was continued for 1 hour while controlling the reactor jacket temperature at 60° C., the monmer (B) shown in Table 1 which consisted of acrylonitrile or a mixture thereof with styrene, was continuously added over 2 hours. Thereafter, the monomer (C) shown in Table 1 which consisted of styrene or a mixture thereof with acrylonitrile, 20 parts of ion-exchanged water, 0.2 part of potassium stearate, and 0.1 part of tertiary dodecylmercaptan was added in the emulsified form. Further, a solution of 0.04 pat of sodium formaldehydesulfoxylate, 0.02 part of sodium ethylenediaminetetraacetate, and 0.002 part of ferrous sulfate in 4 parts of ion-exchanged water was added and then 0.05 part of cumene hydroperoxide were added, after which the polymerization was conducted for 2 hours.

The resulting copolymer latex was coagulated by adding calcium chloride thereto, then separated, washed with water, and dried, to obtain a resin powder. It was pelletized and molded into test specimens by using an injection machine, the cylinder temperature of which was set to 230° C. or 280° C., and Vicat softening temperatures were measured.

COMPARATIVE EXAMPLE 1

A monomer mixture having the same composition as each sample in Examle 1 was prepared by adding the monomer (B) and the monomer (C) to the monomer (A), these being the same as in Example 1, and into a reactor provided with a stirrer and purged with nitrogen were charged said monomer mixture, 200 parts of ion-exchanged water, 2.0 parts of potassium stearate, and 0.4 part of tert-dodecylmercaptan, after which the temperature of the contents was elevated to 40° C. while stirring under a stream of nitrogen. A solution of 0.2 part of sodium formaldehydesulfoxylate, 0.1 part of sodium ethylenediaminetetraacetate, and 0.005 part of ferrous sulfate in 20 parts of ion-exchanged water was added and then 0.3 part of cumene hydroperoxide was added to initiate the polymerization, which was continued for 4 hours. Results of the same treatments of the resulting resin latex as in Example 1 are shown in Table 2.

COMPARATIVE EXAMPLE 2

A monomer mixture prepared by adding the same monomer (B) to the same monomer mixture (A) as in Example 1 was charged together with 180 parts of ion-exchanged water, 1.8 parts of potassium stearate, and 0.3 part of tert-dodecylmercaptan into a reactor equipped with a stirrer which had been purged with nitrogen. The temperature of the mixture was elevated to 40° C. while stirring under a stream of nitrogen. Then, a solution of 0.16 part of sodium formaldehydesulfoxylate, 0.08 part of sodium ethylenediaminetetraacetate, and 0.003 part of ferrous sulfate in 16 parts of ion-exchanged water was added and then 0.25 part of cumene hydroperoxide was added to initiate the polymerization. After continuation of the polymerization for 3 hours while controlling the reactor jacket temperature at 60° C., the same monomer (C) as used in Example 1 was added in the form of an emulsion in a mixture of 20 parts of ion-exchanged water, 0.2 part of potassium laurate, and 0.1 part of tert-dodecylmercaptan. Further, a solution of 0.04 part of sodium formaldehydesulfoxylate, 0.02 part of sodium ethylenediaminetetraacetate, and 0.002 part of ferrous sulfate in 4 parts of ion-exchanged water was added and then 0.05 part of cumene hydroperoxide was added. The resulting mixture was subjected to polymerization for 2 hours. Results of the same treatments of the resulting resin latex as in Example 1 are shown in Table 3.

From the results shown in Tables 1, 2, and 3, it is evident that the polymerization process of this invention gives copolymer resins provided with both high heat resistance and thermal stability. As shown in Table 2, the one-step polymerization process of Comparative Example 1 does not give a resin of high heat resistance. As shown in Table 3, the two-step polymerization of Comparative Example 2, which was adopted for improvement in this respect, gives resins of high heat resistance, which are, however, inferior in thermal stability in high tempeature molding, and hence the heat resistance is greatly reduced. The cause therefor can be considered to be that in these polymerization systems wherein α-methylstyrene and methyl methacrylate are used in high proportions, the concentrations of other comonomeric alkenyl compounds, i.e. acrylonitrile and styrene, extremely decrease in the latter half stage of the polymerization and polymer fractions liable to be thermally decomposed are produced. This indicates that it is indispensable to supply these alkenyl monomers continuously or intermittently as in this invention.

TABLE 1

| Run No. | | 1-1X | 1-2X | 1-3X | 1-4X | 1-5X | 1-6X | 1-7X | 1-8X | 1-9X |
|---|---|---|---|---|---|---|---|---|---|---|
| Monomer mixture (A) | AMS (%) | 55 | 60 | 65 | 75 | 75 | 75 | 80 | 80 | 85 |
| | MMA (%) | 20 | 15 | 10 | 5 | 5 | 5 | 5 | 5 | 5 |
| | AN (%) | 2 | 5 | 10 | 20 | 20 | 20 | 15 | 15 | 10 |
| | ST (%) | 23 | 20 | 15 | 0 | 0 | 0 | 0 | 0 | 0 |
| | Total (parts) | 75 | 70 | 80 | 65 | 75 | 85 | 80 | 80 | 75 |
| Monomer | AN (parts) | 5 | 5 | 10 | 7 | 10 | 10 | 10 | 5 | 15 |

TABLE 1-continued (Example 1)

| Run No. | | 1-1X | 1-2X | 1-3X | 1-4X | 1-5X | 1-6X | 1-7X | 1-8X | 1-9X |
|---|---|---|---|---|---|---|---|---|---|---|
| (B) Monomer | ST (parts) | 0 | 0 | 0 | 8 | 0 | 0 | 0 | 5 | 0 |
| (C) | AN (%) | 35 | 35 | 30 | 20 | 15 | 0 | 10 | 20 | 20 |
| | ST (%) | 65 | 65 | 70 | 80 | 85 | 100 | 90 | 80 | 80 |
| | Total (parts) | 20 | 25 | 10 | 20 | 15 | 5 | 10 | 10 | 10 |
| Vicat softening temperature (°C.) | Injection temp. | | | | | | | | | |
| | 230° C. | 135 | 134 | 139 | 137 | 138 | 140 | 139 | 138 | 140 |
| | 280° C. | 130 | 131 | 133 | 131 | 133 | 133 | 133 | 133 | 133 |
| | Δt | 5 | 3 | 6 | 6 | 5 | 7 | 6 | 5 | 7 |

Note:
AMS: α-Methylstyrene,
MMA: Methyl methacrylate,
AN: Acrylocitrile,
ST: Styrene,
Vicat softening temperature: Measured in accordance with ASTM D-1525.

TABLE 2

(Comparative Example 1)

| Run No. | | 1-1Y | 1-2Y | 1-3Y | 1-4Y | 1-5Y | 1-6Y | 1-7Y | 1-8Y | 1-9Y |
|---|---|---|---|---|---|---|---|---|---|---|
| Monomer mixture (A) + (B) + (C) | AMS (parts) | 41.25 | 42.0 | 52.0 | 48.75 | 56.25 | 63.75 | 64.0 | 64.0 | 63.75 |
| | MMA (parts) | 15 | 10.5 | 8.0 | 3.25 | 3.75 | 4.25 | 4.0 | 4.0 | 3.75 |
| | AN (parts) | 13.5 | 17.25 | 21.0 | 24.0 | 27.25 | 27.0 | 23.0 | 19.0 | 24.5 |
| | ST (parts) | 30.25 | 30.25 | 19.0 | 24.0 | 12.75 | 5 | 9 | 13.0 | 8.0 |
| Vicat softening temperature (°C.) | Injection temp. | | | | | | | | | |
| | 230° C. | 123 | 120 | 124 | 122 | 124 | 128 | 127 | 124 | 126 |
| | 280° C. | 117 | 115 | 118 | 115 | 116 | 120 | 120 | 118 | 116 |
| | Δt | 6 | 5 | 6 | 7 | 8 | 8 | 7 | 6 | 10 |

TABLE 3

(Comparative Example 2)

| Run No. | | 2-1Y | 2-2Y | 2-3Y | 2-4Y | 2-5Y | 2-6Y | 2-7Y | 2-8Y | 2-9Y |
|---|---|---|---|---|---|---|---|---|---|---|
| Monomer mixture (A) + (B) | AMS (parts) | 41.25 | 42.0 | 52.0 | 48.75 | 56.25 | 63.75 | 64.0 | 64.0 | 63.75 |
| | MMA (parts) | 15 | 10.5 | 8.0 | 3.25 | 3.75 | 4.25 | 4.0 | 4.0 | 3.75 |
| | AN (parts) | 6.5 | 8.5 | 18.0 | 20.0 | 25.0 | 27.0 | 22.0 | 17.0 | 22.5 |
| | ST (parts) | 17.25 | 14.0 | 12.0 | 8 | 0 | 0 | 0 | 5 | 0 |
| Monomer (C) | AN (%) | 35 | 35 | 30 | 20 | 15 | 0 | 10 | 20 | 20 |
| | ST (%) | 65 | 65 | 70 | 80 | 85 | 100 | 90 | 80 | 80 |
| | Total (parts) | 20 | 25 | 10 | 20 | 15 | 5 | 10 | 10 | 10 |
| Vicat softening temperature (°C.) | Injection temp. | | | | | | | | | |
| | 230° C. | 133 | 133 | 136 | 137 | 136 | 140 | 137 | 136 | 139 |
| | 280° C. | 120 | 119 | 122 | 122 | 122 | 125 | 122 | 124 | 125 |
| | Δt | 13 | 14 | 14 | 15 | 14 | 15 | 15 | 12 | 14 |

EXAMPLE 2

Preparation of graft copolymer

One third of an emulsion (a) consisting of 60 parts of ion-exchanged water, 28 parts of styrene, 12 parts of acrylonitrile, 1 part of potassium stearate, and 0.2 part of tert-dodecylmercaptan; 80 parts of ion-exchanged water; and 60 parts (as solids) of a polybutadiene latex were charged and emulsified in a reactor equipped with a stirrer and purged with nitrogen. The temperature of the emulsified mixture was elevated to 40° C. while stirring under a stream of nitrogen. A solution of 0.2 part of sodium pyrophosphate, 0.4 part of glucose, and 0.01 part of ferrous sulfate in 20 parts of ion-exchanged water with 0.1 part of cumene hydroperoxide was added to effect the reaction for 1 hour while keeping the reactor jacket temperature at 70° C. Then, the rest of the monomer emulsion (a) and 0.1 part of cumene hydroperoxide were continuously fed to the reactor over 3 hours, after which a solution of 0.05 part of sodium pyrophosphate, 0.1 part of glucose, and 0.0025 part of ferrous sulfate in 5 parts of ion-exchanged water and 0.025 part of cumene hydroperoxide were added and the polymerization was further continued for 1 hours to be completed.

Preparation of resin composition

Each of the copolymers prepared in Example 1 and Comparative Examples 1 and 2 was mixed with the above graft copolymer both in the latex form at a solid weight ratio of 67:35 (each resalting composition contained about 20% of the diene rubbery polymer). After addition of an antioxidant, the mixture was coagulated by using calcium chloride. The coagulum was filtered, washed, and dried to obtain a resin powder. The resin powder thus prepared was pelletized and molded into test specimens by using an injection machine at a cylinder temperature of 230° C. Results of measuring physical properties on these specimens are shown in Table 4. The Vicat softening temperature was measured also on specimens injection-molded at a cylinder temperature of 280° C.

TABLE 4

| Run No. | 2-1 | 2-2 | 2-3 | 2-4 | 2-5 | 2-6 | 2-7 | 2-8 | 2-9 |
|---|---|---|---|---|---|---|---|---|---|
| Copolymer sample No. | 1-2X | 1-5X | 1-7X | 1-2Y | 1-5Y | 1-7Y | 2-2Y | 2-5Y | 2-7Y |

TABLE 4-continued

| Run No. | 2-1 | 2-2 | 2-3 | 2-4 | 2-5 | 2-6 | 2-7 | 2-8 | 2-9 |
|---|---|---|---|---|---|---|---|---|---|
| Izod impact (Kg · cm/cm) | 14 | 19 | 15 | 16 | 20 | 14 | 13 | 18 | 16 |
| Tensile yield (Kg/cm) | 463 | 482 | 426 | 448 | 477 | 416 | 458 | 485 | 420 |
| Elongation at break (%) | 48 | 36 | 40 | 43 | 38 | 42 | 41 | 40 | 39 |
| Vicat softening temp. of specimen injected | | | | | | | | | |
| at 230° C. (°C.) | 130 | 132 | 133 | 117 | 118 | 120 | 128 | 132 | 135 |
| at 280° C. (°C.) | 129 | 130 | 131 | 117 | 117 | 118 | 122 | 124 | 125 |
| Δt | 1 | 2 | 2 | 0 | 1 | 2 | 6 | 8 | 10 |

Note:
Izod impact (notched): Measured in accordance with ASTM D-256 at 23° C.
Tensile yield and elongation at break: Measured in accordance with ASTM D-638

From Table 4, it is evident that, also in the copolymer-graft copolymer compositions, those prepared from the copolymers of Example 1 are superior in heat resistance and thermal stability.

EXAMPLE 3

Graft copolymers were prepared in the same manner as in Example 2, except that varying amounts of the polybutadiene latex (amount as solids), styrene, and acrylonitrile were used. The graft polymers were mixed each with the copolymer prepared in Example 1. Physical properties of the resulting resin compositions were measured in the same fashion as in Example 2. The results are shown in Table 5.

TABLE 5

| Run No. | 3-1 | 3-2 | 3-3 | 3-4 | 3-5 | 3-6 | 3-7 | 3-8 | 3-9 |
|---|---|---|---|---|---|---|---|---|---|
| Copolymer sample No. | 1-7X | 1-7X | 1-7X | 1-7X | 1-7X | 1-7X | 1-7X | 1-7X | 1-7X |
| Mixing proportion (parts) | 33 | 50 | 83 | 67 | 50 | 67 | 67 | 71 | 75 |
| Graft copolymer | | | | | | | | | |
| Rubber content (%) | 30 | 40 | 60 | 60 | 60 | 60 | 60 | 70 | 80 |
| Styrene unit content (%) | 49 | 42 | 28 | 28 | 28 | 32 | 26 | 21 | 14 |
| Acrylonitrile unit content (%) | 21 | 18 | 12 | 12 | 12 | 8 | 14 | 9 | 6 |
| Mixing proportion of graft copolymer (parts) | 67 | 50 | 17 | 33 | 0 | 33 | 33 | 29 | 25 |
| Rubber content in composition (%) | 20 | 20 | 10 | 20 | 30 | 20 | 20 | 20 | 20 |
| Izod impact (Kg · cm/cm) | 23 | 18 | 8 | 15 | 28 | 10 | 19 | 12 | 6 |
| Vicat softening temp. of specimen injected | | | | | | | | | |
| at 230° C. (°C.) | 117 | 125 | 135 | 132 | 126 | 131 | 133 | 133 | 136 |
| at 280° C. (°C.) | 117 | 124 | 132 | 131 | 125 | 129 | 130 | 130 | 131 |
| Δt | 0 | 1 | 3 | 1 | 1 | 2 | 3 | 3 | 5 |

The balance between the impact strength and the heat resistance depends upon the diene rubbery polymer content in the graft copolymer and upon the mixing proportion of the copolymer resin. As shown in Table 5, when the rubber content in the graft copolymer is less than 40%, the heat resistance is insufficient, and when the content exceeds 70%, the impact strength becomes considerably decreased.

EXAMPLE 4

Similarly to Example 2, a graft copolymer was prepared by using 40 parts (as solid) of the polybutadiene latex, 43 parts of styrene, 17 parts of acrylonitrile, and 0.02 part of tert-dodecylmercaptan. The resulting graft copolymer was mixed with the copolymer prepared in Example 1, at different mixing ratios. Results of measuring physical properties on the resulting compositions are shown in Table 6.

TABLE 6

| Run No. | 4-1 | 4-2 |
|---|---|---|
| Copolymer sample No. | 1-2X | 1-2X |
| Mixing proportion (parts) | 75 | 50 |
| Graft copolymer | | |
| Mixing proportion (parts) | 25 | 50 |
| Intrinsic viscosity of matrix polybutadiene ([η]) (at 30° C., in MEK)[*1] | 0.54 | 0.54 |
| Grafting degree (%)[*2] | 102 | 102 |
| Rubber content in composition (%) | 10 | 20 |
| Izod impact (Kg · cm/cm) | 15 | 30 |
| Vicat softening temp. of specimen injected | | |
| at 230° C. (°C.) | 138 | 130 |
| at 280° C. (°C.) | 134 | 126 |
| Δt | 4 | 4 |

Note:
[*1] Methyl ethyl ketone.
[*2] (Weight increase after graft polymerization) × 100/(original rubber weight as solids)

As is apparent from Tables 4, 5, and 6, a thermoplastic resin composition superior in impact strength, heat resistance, and thermal stability can be obtained by mixing the foregoing graft copolymer with the thermoplastic resin prepared according to the process of this invention.

What is claimed is:

1. A process for producing a thermoplastic resin having an excellent thermal stability and a high heat resistance, which comprises (1) the first step of initiating polymerization of 65–85 parts by weight of a monomer mixture (A) consisting of 50–85% by weight of α-methylstyrene, 3–20% by weight of methyl methacrylate, 2–20% by weight of acrylonitrile, and 0–25% by weight of an aromatic alkenyl compound other than α-methylstyrene, (2) the second step of then adding continuously or intermittently 2–15 parts by weight of a monomer (B) consisting of acrylonitrile or a mixture thereof with an aromatic alkenyl compound other than α-methylstyrene, and continuing the polymerization and (3) the third step of further adding 5–25 parts by weight of a monomer (C) consisting of an aromatic alkenyl compound, other than α-methylstyrene, or a mixture thereof with acrylonitrile when the polymerization reaches 60% or more based on the total of the monomers (A) and (B) used, and continuing the polymerization to complete the polymerization, the total amount of monomers (A), (B), and (C) being 100 parts by weight.

2. A process according to claim 1, wherein the monomer (C) is added when the polymerization conversion reaches 70% or more based on the total of the monomers (A) and (B) used.

3. A process according to claim 1, wherein the monomer (B) is added so that the total amount of acrylonitrile in the monomer (B) and acrylonitrile remaining unreacted in the polymerization system does not exceed 40% by weight based on the total weight of monomers remaining unreacted at that time.

4. A process according to claim 1, wherein the aromatic alkenyl compound other than α-methylstyrene is styrene, a ring-halogenated styrene, p-methylstyrene, or vinyltoluene.

5. A process according to claim 1, wherein the aromatic alkenyl compound other than α-methylstyrene is styrene.

6. A process according to claim 1, wherein the polymerization is effected by emulsion polymerization.

7. A process according to claim 6, wherein the emulsifier used is selected from the group consisting of potassium or sodium salts of higher fatty acids, alkali metal salts of alkylbenzenesulfonic acids, alkali metal salts of higher alkyl sulfates, and salts of disproportionated rosin acid.

8. A process according to claim 6 or 7, wherein the polymerization catalyst used is selected from the group consisting of persulfates and redox catalysts which are combinations of organic peroxides and reducing agents.

9. A thermoplastic resin obtained by the process of claim 1.

10. A process for producing a thermoplastic resin composition having excellent a thermal stability, a high heat resistance, and a high impact strength, which comprises mixing the thermoplastic resin of claim 9 with a graft copolymer obtained by grafting 60-30 parts by weight of a monomer mixture consisting of 65-80% by weight of an aromatic alkenyl compound and 35-20% by weight of acrylonitrile on 40-70 parts by weight of a diene rubbery polymer, so that the composition contains 10-30% by weight of the diene rubbery polymer.

11. A process according to claim 10, wherein the diene rubbery polymer is polybutadiene, butadienestyrene copolymer, poisoprene, polychloroprene, or a mixture of these polymers.

12. A process according to claim 10 or 11, wherein the aromatic alkenyl compound is styrene, α-methylstyrene, p-methylstyrene, or vinyltoluene.

13. A process according to claim 10 or 11, wherein the aromatic alkenyl compound is styrene.

14. A process according to claim 10, wherein the monomer mixture contains a small amount of an alkyl methacrylate or acrylate.

15. A process according to claim 10, wherein a styrene-acrylonitrile copolymer is further mixed with the thermoplastic resin and the graft copolymer.

16. A thermoplastic resin composition having excellent thermal stability, high heat resistance, and high impact strength produced by the process of claim 10.

* * * * *